United States Patent Office 3,507,659
Patented Apr. 21, 1970

3,507,659
PHOTOSENSITIVE POLYHYDROXYAMINOETHER
SALT COMPOSITIONS
Charles N. Merriam, Martinsville, and Walter A. Miller, Somerville, N.J., assignors to Union Carbide Corporation, a corporation of New York
No Drawing. Filed Sept. 13, 1965, Ser. No. 487,027
Int. Cl. G03c 1/72, 1/78
U.S. Cl. 96—114                                                   14 Claims

ABSTRACT OF THE DISCLOSURE

Continuous photosensitive compositions have been prepared by reacting a polyhydroxy amino ether having a degree of polymerization of at least 30 with a hydrohalide followed by the reaction of the product thereof with silver nitrate.

---

This invention relates to photosensitive polyhydroxyaminoether salt compositions and more particularly to films of silver salts of these compositions.

Commercially available photographic films are laminates comprising a film support, generally glass, paper or polymeric film, a photosensitve emulsion containing one or more silver halides suspended in gelatin and usually an intermediate gelatin layer generally termed "subbing" to insure adhesion of the emulsion to the film support.

The most widely adopted film supports for photosensitive emulsions are those of organic esters of cellulose, e.g., cellulose nitrate and cellulose triacetate. Few other materials are useful as film supports for photosensitive emulsions. Specialty film supports include polyethylene terephthalate, polystyrene and polycarbonate, but their use is not widespread because gelatin containing compositions can be adhered only with difficulty to these film supports.

Cellulose triacetate is the most popular flexible film support for roll film and movie film. This material, however, exhibits the usual undesirable properties of cellulose esters, particularly a pronounced tendency to absorb moisture. Cellulose triacetate absorbs 3.5% of its own weight in water in a 70° F. environment with 90% of relative humidity. Also, cellulose triacetate film is inherently brittle and must be highly plasticized e.g., with from 5 to 25% triphenyl phosphate. Presence of plasticizers means weight loss, thermal embrittlement and dimensional instability upon film support aging, especially at elevated temperatures. As is typical of cellulose ester films, cellulose triacetate curls badly upon immersion in water or photographic solutions unless the film is modified during manufacture by costly and laborious techniques.

This system is also prone to such problems as to delamination, scratching of the emulsion, heat sensitivity and the like.

It has now been found that continuous, photosensitive compositions can be prepared from (a) polyhydroxyaminoether salts having the formula:

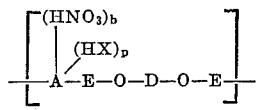

wherein A is an N-radical residuum of an amine, $b$ is a number having values of 1 to 2, X is an anion of an acid, $p$ is a number having values of 0 to 1, E is an hydroxyl containing radical residuum of an epoxide, and D is the radical residuum of a dihydric phenol; and (b) a silver halide.

The amine can be aliphatic, cycloaliphatic or aromatic. Examples of suitable aliphatic amines include ethyl amine, n-propylamine, n-butylamine and the like. Examples of suitable cycloaliphatic amines are piperazine, 2,5-dimethylpiperazine and the like. Examples of suitable aromatic amines are aniline, p-methyl aniline and the like.

The dihydric phenol contributing the phenol radical residuum D, can be either a dihydric mononuclear phenol or a dihydric polynuclear phenol such as those having the general formula:

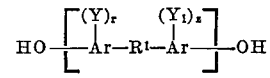

wherein Ar is an aromatic divalent hydrocarbon such as naphthalene and preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example,

—O—, —S—, —SO—, —SO$_2$— and —S—S—, and divalent hydrocarbon radicals such as alkylene, alkylidene, cycloaliphatic e.g., cycloalkylene and cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl)-1,2-bis(phenyl)propane,
2,2-bis(4-hydroxyphenyl)-1-phenyl-propane and the like;

Di(hydroxyphenyl)sulfones such as bis(4-hydroxyphenyl)sulfone,
2,4'-dihydroxydiphenyl sulfone, 5'-chloro-2,4'-dihydroxydiphenyl sulfone,
5'-chloro-4,4'-dihydroxydiphenyl sulfone and the like;

Di(hydroxyphenyl)ethers such as bis(4-hydroxyphenyl)ether, the 4,3'-, 4,2'-, 2,2'-,
2,3'-dihydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane, and the bisphenol reaction products of dipentene or its isomers and phenols such as 1,2-bis(p-hydroxyphenyl) - 1 - methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula:

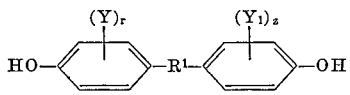

wherein Y and $Y_1$ are as previously defined, $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus

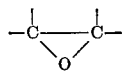

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., >C=C< and acetylenic unsaturation, i.e., —C≡C—, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epihalohydrins such as epichlorohydrin, epibromohydrin,
1,2-epoxy-1-methyl-3-chloropropane,
1,2-epoxy-1-butyl-3-chloropropane,
1,2-epoxy-2-methyl-3-fluoropropane, and the like.

Illustrative diepoxides include diethylene glycol bis(3,4-epoxycyclohexane-carboxylate),
bis(3,4-epoxycyclohexylmethyl)adipate,
bis(3,4-epoxycyclohexylmethyl)phthalate,
6-methyl-3,4-epoxycyclohexylmethyl-6-methyl-3,4-epoxycyclohexane carboxylate,
2-chloro-3,4-epoxycyclohexylmethyl-2-chloro-3,4-epoxycyclohexane carboxylate,
diglycidyl ether,
bis(2,3-epoxycyclopentyl)ether,
1,5-pentanediol bis(6-methyl-3,4-epoxycyclohexylmethyl) ether,
bis(2,3-epoxy-2-ethylhexyl)adipate,
diglycidyl maleate,
diglycidyl phthalate,
4-oxatetracyclo[4.4.0.1$^{7,10}$.0$^{2,4}$]undec-8-yl,
2,3-epoxypropyl ether,
bis(2,3-epoxycyclopentyl)sulfone,
bis(3,4-epoxyhexoxypropyl)sulfone,
2,2'-sulfonyldiethyl bis(2,3-epoxycyclopentane-carboxylate),
3-oxatetracyclo[4.4.0.1$^{7,10}$.0$^{2,4}$]undec-8-yl,
2,3-epoxybutyrate,
4-pentenal-di-(6-methyl-3,4-epoxycyclohexylmethyl) acetal,
ethylene glycol bis(9,10-epoxystearate),
diglycidyl carbonate,
bis(2,3-epoxybutylphenyl)-2-ethylhexyl phosphate,
diepoxydioxane,
butadienedioxide, and 2,3-dimethyl butadiene dioxide. The preferred diepoxides are those wherein each of the oxirane groups is connected to an electron donating substituent which is not immediately connected to the carbon atoms of the oxirane group. Such diepoxides have the grouping

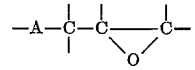

wherein A is an electron donating substituent such as

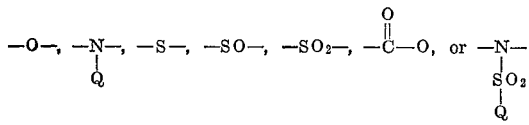

and Q is a saturated hydrocarbon radical such as an alkyl, cycloalkyl, aryl or aralkyl radical.

The preparation of photosensitive compositions of this invention is accomplished by:

(a) Reacting a polyhydroxyaminoether, having the formula:

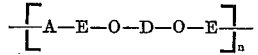

wherein $n$ is an integer denoting molecular weight and is at least 30, A is an N-radical residuum of an amine, E is an hydroxyl containing radical residuum of an epoxide, and D is the radical residuum of a dihydric phenol, with a hydrohalide, HX, wherein X is a chloride or bromide anion;

(b) Removing unreacted hydrohalide;

(c) Reacting the product of (a) which has the formula:

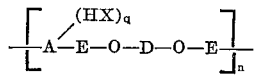

wherein A, E, D, $n$ and X are as represented above, and $q$ is an integer having values of 1 or 2, with silver nitrate;

and, (d) Removing unreacted silver nitrate.

The reaction of the product of (a) with silver nitrate results in conversion of halide anion of HX to silver halide and its replacement by nitrate anion.

The amounts of hydrohalides and silver nitrate used to make the photosensitive compositions are not narrowly critical so that stoichiometric as well as considerably less than stoichiometric quantities can be used. It follows of course, that the stoichometric quantities afford the maximum concentration of silver halide in the composition and hence films of maximum contrast after exposure to light.

Where less than stoichiometric quantities of silver nitrate are used, vis-à-vis the amounts of hydrohalide, the photosensitive composition is made up of polyhydroxyaminoether salts containing some of the original hydrohalide and some newly formed nitrate plus precipitated silver chloride. Where the siver nitrate reacts with all of the hydrohalide, then none of the original hydrohalide polyhydroxyaminoether salt remains in the product composition.

These photosensitive compositions can be used to make films which print out upon exposure to sun without the use of developing agents to reduce the silver halide to metallic silver or to make films which develop a latent image upon exposure to artificial white light. In the latter use the latent image is developed with conventional hydroquinone developing solutions. In both instances unreduced silver halide is removed from the film with sodium thiosulfate in the conventional fixing bath.

The photosensitive compositions of this invention are unique in that the light sensitive, silver halide, image forming sites are embedded within the tough polyhydroxyaminoether and hence both before and after an image forming operation are highly resistant to scratches and heat and of course, cannot delaminate since there are no layers, the composition being a continuous one.

The polyhydroxyaminoethers used in this invention are prepared by the condensation polymerization of a diglycidyl ether having of the formula:

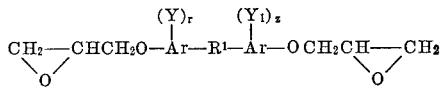

wherein Ar, Y, $Y_1$, $r$, $z$ and $R^1$ are as described previously, with an amine having two amino hydrogens.

The diglycidyl ethers can be prepared by the reaction of a dihydric phenol with an epoxide both of which have been described previously. The preparation of diglycidyl ethers is described in Epoxy Resins, H. Lee and K. Neville, McGraw-Hill Book Co., N.Y.C., 1957.

The polyhydroxyaminoethers can be prepared either in solution or bulk using approximately stoichiometric quantities of amine and diglycidyl ether. It is preferred to use a slight excess of amine to obtain a high molecular weight product, that is, one having a reduced viscosity of 0.2 or higher. Neither temperature nor pressure are critical in the preparation of the polyhydroxyaminoethers. It is convenient to use atmospheric pressure and where solvents are used the reflux temperature of the solvent system. In bulk polymerizations a temperature range of about 100 to 250° C. can be used although temperatures above and below can also be used. In solution polymerizations temperatures up to the reflux temperature of the solvent system can be used.

The invention is further described in the examples which follow where all parts and percentages are by weight unless otherwise specified.

EXAMPLE 1

Piperazine, 43.9 g., was dissolved in a mixed solvent of 150 g. of 95% ethanol and 150 g. of dimethyl sulfoxide contained in a 1-liter 3-neck round-bottom flask equipped with a reflux condenser, mechanical stirrer, thermometer and nitrogen inlet tube. An exothermic reaction resulted when 122 g. of the diglycidyl ether of Bisphenol-A was added. When the exotherm subsided, an additional 52 g. of the diglycidyl ether of Bisphenol-A was added to the reaction mixture. The batch was refluxed at 85° C. until its viscosity no longer appeared to be increasing. This period was approximately 5 hours during which time small increments of dimethyl sulfoxide were added in an amount sufficient to keep the polymer solution clear and at a stirrable viscosity level. The polymer was then coagulated in water in a Waring Blendor. The fibrous polymer which resulted was washed once with water to remove the bulk of the organic solvent. The wet polymer was then dried at 80° C. in a vacuum oven for 4 days. The reduced viscosity of the polymer in tetrahydrofuran (0.2 g./100 ml.) at 25° C. was 0.53. The identity of the polyhydroxyaminoether thus obtained was established by nitrogen analysis: Calculated, 6.55% N; Found, 6.55% N. At 220° C. this polymer had the following melt flow values:

at 44 p.s.i.: 4.92 dg./min.
at 220 p.s.i.: 31.4 dg./min.

Melt flow of each of the polymers was determined by weighing in grams the amount of polymer, which at a temperature of 220° C. and under a pressure of 44 p.s.i. or 220 p.s.i., flowed through an orifice having a diameter of 0.0825″ and a length of 0.315″ over a ten minute period. Four such determinations were made and the average of the four determinations is reported as decigram per minute.

Reduced viscosity values were computed by the use of the equation:

$$\text{Reduced Viscosity} = \frac{t_s - t_o}{ct_o}$$

wherein $t_o$ is the efflux time of the solvent, $t_s$ is the efflux time of the polymer solution, $c$ is the concentration of polymer solution in terms of grams of polymer per 100 ml. of solvent.

Glass transition temperatures, commonly referred to as second order phase transition temperatures, refer to the inflection temperatures found by plotting the resilience (recovery from 1% elongation) of a film ranging in thickness from 3–15 mils against the temperature. A detailed explanation for determining resilience and inflection temperatures is to be found in an article by A. Brown in "Textile Research Journal" 25, 891 (1955).

EXAMPLE 2

A 10 mil film of the polyhydroxyaminoether prepared in Example 1 was immersed in a 5% aqueous HCl solution at room temperature for 24 hours. The film was washed free of HCl with water and dried. The film was then immersed in a 10% aqueous silver nitrate solution in the dark for two hours. Excess silver nitrate was then removed from the surface washing the film again in water. Exposure of this film to sunlight for two minutes produced a print out image through the film. No chemical reducing agents or developers were needed to reduce the silver nitrate, to metallic silver. This effect was achieved solely by the exposure to sunlight. As a final step the unreduced silver chloride in the film was removed by soaking the film in aqueous sodium thiosulfate, thus affording a permanent image in the film.

EXAMPLE 3

A film of the polyhydroxyaminoether prepared in Example 1 was exposed to artificial white light for 1 minute. No print out image was apparent. The light exposed film was treated with a conventional developing solution containing hydroquinone. A time of 5 minutes in this developing solution was sufficient to develop the latent image. A dilute solution of aqueous sodium thiosulfate was used to dissolve out the unreduced AgCl precipitate and fix the exposed film.

EXAMPLE 4

The procedure described in Example 1 was followed using trans-2,5-dimethylpiperazine in place of piperazine. A polyhydroxyaminoether was obtained having the formula:

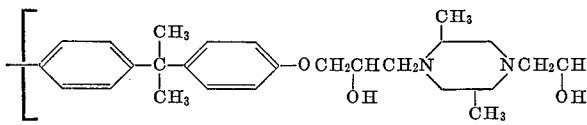

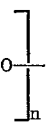

wherein $n$ represents the degree of polymerization and is at least 30.

The reduced viscosity of this polymer (0.2 g. in 100 ml. of tetrahydrofuran at 25° C.) was 0.31.

EXAMPLE 5

A 5 mil film of the polyhydroxyaminoether prepared in Example 4 was immersed in a 10% aqueous solution of hydrobromic acid for one hour at room temperature. The film was washed free of excess acid and immersed in a 20% aqueous solution of silver nitrate in the dark for 30 minutes washed and dried. Exposure of this film to sunlight for two minutes produced an intense print out image. Unreacted silver bromide was dissolved out of the film by immersion in a dilute aqueous solution of sodium thiosulfate.

EXAMPLE 6

Film produced from the polyhydroxyaminoether prepared in Example 4 was immersed in a 5% aqueous hydrobromic acid solution at 50° C. for 15 minutes. The excess acid was washed from the film with water and the film then immersed in 5% aqueous silver nitrate at 50° C. for 5 minutes. A light sensitive film capable of both print out with sunlight and latent image formation with artificial white light was produced. The latent image was developed with conventional hydroquinone developers and fixed with sodium thiosulfate solution.

EXAMPLE 7

The procedure described in Example 1 was followed substituting n-butylamine for piperazine. A polyhydroxyaminoether having the formula

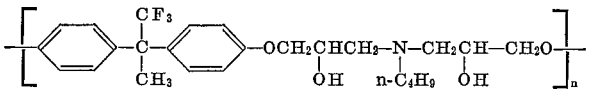

wherein $n$ represents the degree of polymerization and is at least 30, was obtained having a reduced viscosity (0.2 g. in 100 ml. of tetrahydrofuran at 25° C.) of 0.46.

EXAMPLE 8

A film 5–10 mils thick was prepared from the polyhydroxyaminoether prepared in Example 7 and immersed in a 5% aqueous solution of hydrobromic acid for 30 minutes at room temperature. After rinsing off the excess acid in water, the film was immersed in a 5% aqueous solution of silver nitrate for 30 minutes at room temperature. A white precipitate formed in the film. When exposed to sunlight for a few minutes a print out image was produced. The image was made permanent by dissolving out the unexposed silver bromide with a dilute solution of sodium thiosulfate.

EXAMPLE 9

In a side-arm test tube with inlet for dry nitrogen gas, were placed 11.0614 g. (0.06427 equivalents) of a high-purity Bisphenol-A diglycidyl ether (Dow Chemical Co. DER–332–LC, epoxy equivalent 172.1) and 7.3823 g. (0.06524 equivalent, a nominal 1.5% excess) of bis(p-N-methylaminophenyl)methane. The test tube was placed in an oil bath preheated to 140° C. and left there for 11 minutes; the mixture became homogeneous and fairly viscous. The tube was then transferred to a second oil bath at 230° C. and left there for 18 minutes. During this period the melt became so viscous that the bubbles of nitrogen formed channels.

When the tube was cooled, its contents were dissolved in 220 ml. of chloroform. The solution was filtered to remove a little insoluble gel, and the polymer was coagulated by addition to 2 liters of hexane in a Waring Blendor. It was washed in the blendor with 1 l. of hexane and dried overnight in a vacuum oven at 80° C.

The yield of polymer, reduced viscosity (0.2 g./100 ml. in tetrahydrofuran at 25° C.) 0.70 was 17.24 g. (93.5%).

EXAMPLE 10

A film of the polyhydroxyaminoether prepared in Example 9 and treated as in Example 8 was light sensitive and capable of forming both print out and latent images.

EXAMPLE 11

A 10% by weight solution of the polyhydroxyaminoether made from the diglycidyl ether of Bishpenol-A and aniline in methylene chloride was made. A water solution of 5% HCl was slurried with the polymer solution for 2 hours. A precipitation occurred, and the reacted polymer was recovered and dried at 70° in air for 24 hours. After molding a sheet of the dried resin, it was found that the glass transition temperature of the product was 115° to 120° as compared to the original 100° for the untreated polymer. Chlorine analysis indicated that the salt formation was about 50%–70% complete.

EXAMPLE 12

A film 5 mils thick of the polyhydroxyaminoether prepared in Example 11 was soaked in a 5% aqueous solution of hydrobromic acid for 24 hours at room temperature. After rinsing off excess acid in water, the film was immersed in a 5% aqueous silver nitrate solution thus precipitating silver bromide within the film. After exposure to sunlight for 20 minutes a print out image was obtained.

Although the invention has been described in its preferred forms with a certain degree of particularity, it is understood that the present disclosure has been made only by way of example and that numerous changes may be made without departing from the spirit and scope of the invention.

What is claimed is:
1. Photosentive self-supporting film comprising:
   (a) a polyhydroxyaminoether salts having the formula:

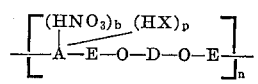

wherein $n$ is at least 30, A is an N-radical residuum of an amine having two amino hydrogens selected from the group consisting of aliphatic amines having up to 4 carbon atoms, cycloaliphatic amines having 2 nitrogen and 4 carbon atoms in the ring, aromatic amines having 6 carbon atoms and bis (N-methylaminophenyl)methanes, $b$ is a number having values of 1 to 2, X is an anion selected from the group consisting of chloride or bromide, $p$ is a number having values of 0 to 1 where $b+p=2$, E is an hydroxyl containing radical residuum of a glycidyl ether bonded through the carbon atoms, and D is the radical residuum of a dihydric phenol resulting from the removal of both hydroxyl hydrogen atoms, and;

(b) a silver halide selected from the group consisting of silver chloride or silver bromide embedded within said film as image forming sites.

2. The composition claimed in claim 1 wherein E is the radical residuum of an epihalohydrin and D is the radical residuum of a bis(p-hydroxyphenyl)propane.

3. The composition claimed in claim 2 wherein A is the radical residuum of piperazine, X is Cl⁻ and the silver halide is silver chloride.

4. The composition claimed in claim 2 wherein A is the radical residuum of dimethylpiperazine, X is Br⁻ and the silver halide is silver bromide.

5. The composition claimed in claim 2 wherein A is the radical residuum of an n-butylamine, X is Br⁻ and the silver halide is silver bromide.

6. The composition claimed in claim 2 wherein A is the radical residuum of bis (p-N-methylaminophenyl)methane, X is Br⁻ and the silver halide is silver bromide.

7. The composition claimed in claim 2 wherein A is the radical residuum of aniline, X is Br⁻ and the silver halide is silver bromide.

8. Method of preparing a photosensitive self-supporting film which comprises:
  (a) reacting a film of a polyhydroxyaminoether, having the formula:

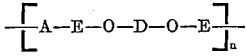

wherein $n$ is at least 30, A is an N-radical residuum of an amine having two amino hydrogens selected from the group consisting of aliphatic amines having up to 4 carbon atoms, cycloaliphatic amines having 2 nitrogen and 4 carbon atoms in the ring, aromatic amines having 6 carbon atoms and bis (N-methylaminophenyl)methanes, E is an hydroxyl containing radical residuum of a glycidyl ether bonded through the carbon atoms, and D is the radical residuum of a dihydric phenol resulting from the removal of both hydroxyl hydrogen atoms, with a hydrohalide selected from the group consisting of HCl or HBr;
  (b) removing unreacted hydrohalide;
  (c) reacting the film with silver nitrate; and
  (d) removing unreacted silver nitrate.

9. The method claimed in claim 9 wherein E is the radical residuum of an epihalohydrin and D is the radical residuum of a bis(p-hydroxyphenyl)propane.

10. The method claimed in claim 10 wherein A is the radical residuum of piperazine and the hydrohalide is hydrochloric acid.

11. The method claimed in claim 10 wherein A is the radical residuum of dimethylpiperazine and the hydrohalide is hydrobromic acid.

12. The method claimed in claim 10 wherein A is the radical residuum of n-butylamine and the hydrohalide is hydrobromic acid.

13. The method claimed in claim 10 wherein A is the radical residuum of bis(p-N-methylaminophenyl)methane and the hydrohalide is hydrobromic acid.

14. The method claimed in claim 10 wherein A is the radical residuum of aniline and the hydrohalide is hydrobromic acid.

References Cited

UNITED STATES PATENTS 2,860,980  11/1958  Milton _____ 96—87 X
3,249,439   5/1966  Bugel _____ 96—87

NORMAN G. TORCHIN, Primary Examiner

RICHARD E. FICHTER, Assistant Examiner

U.S. Cl. X.R.
96—87